July 4, 1939.  D. A. HARRIS  2,164,816
MILK CAN
Filed Jan. 24, 1938
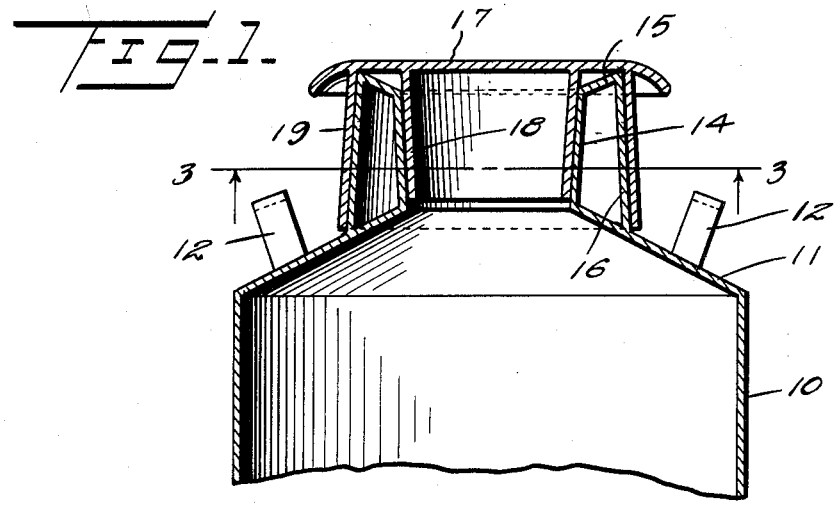
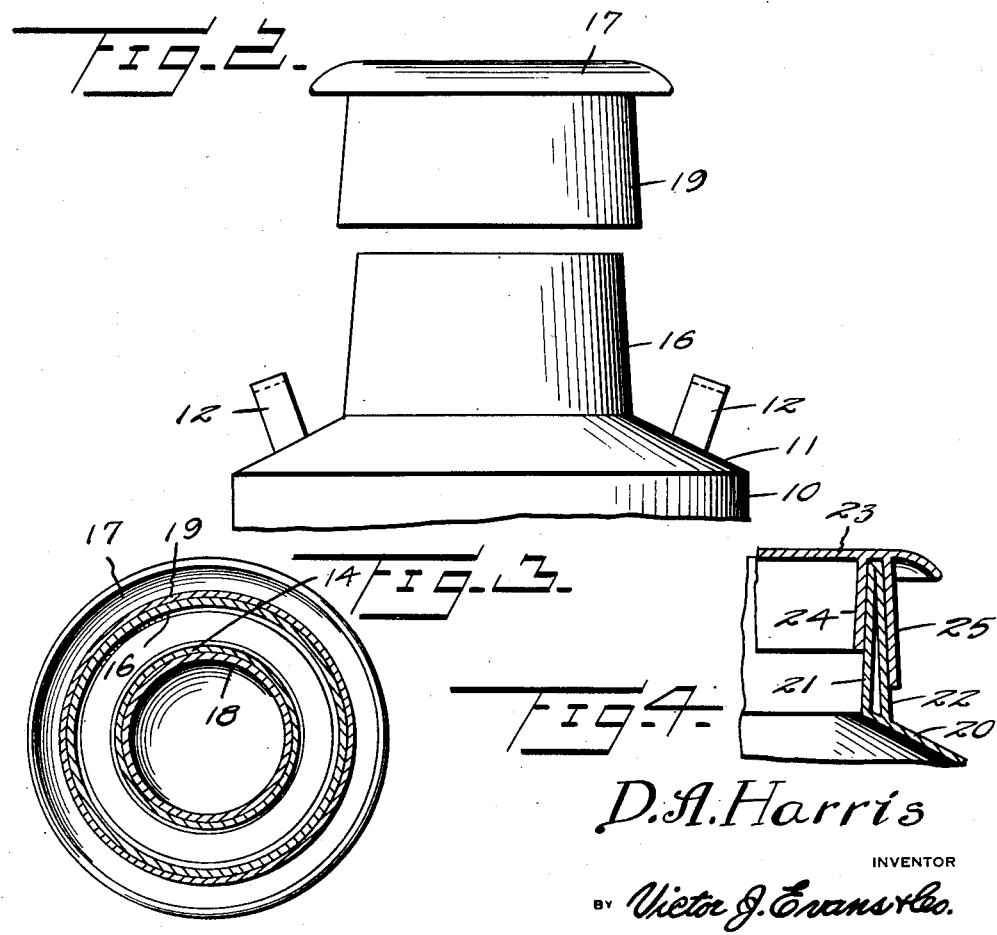
D. A. Harris
INVENTOR
BY Victor J. Evans & Co.
ATTORNEYS Patented July 4, 1939

2,164,816

UNITED STATES PATENT OFFICE 2,164,816

MILK CAN

David A. Harris, New Kensington, Pa.

Application January 24, 1938, Serial No. 186,688

1 Claim. (Cl. 220—24)

This invention relates to milk cans.

Conventional milk cans now in use have a funnel shaped top or neck and a mushroom lid that fits down in the neck. This leaves a pocket in the top of the can and under the lid in which dust, dirt and insects settle while the can is being transported. When the lid is removed the collected dirt and insects drop into the milk. To eliminate the above described unsanitary conditions the present invention has for an object to provide a can having a neck and lid so constructed as to positively prevent entrance of foreign matter and at the same time positively prevent escape of milk from the can.

A further object is to provide a milk can and lid which may be constructed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view through the upper portion of a milk can and lid constructed in accordance with the invention.

Figure 2 is a side elevation of the parts shown in Figure 1.

Figure 3 is a cross sectional view taken on the line 3—3 of Figure 1 looking in the direction of the arrow-heads.

Figure 4 is a detail sectional view of a modified form of the invention.

Referring now to the drawing in which like characters of reference designate similar parts in the various views, 10 designates the body of a milk can, the same having a frusto-conical top 11 to which handles 12 are secured in any preferred manner. The top 11 is provided with an upstanding neck 14 which is substantially cylindrical but tapers toward the top 11, the wide end of the neck being at the top of the neck, as best shown in Figure 1.

The neck 14 is provided with a short funnel shaped flange 15, formed integral therewith, and the flange is provided with a frusto-conical skirt 16 which is disposed coaxial with the neck 14 and is terminally secured to the top 11 by solder or other preferred means. The neck 14, funnel shaped flange 15 and skirt 16 provide a double walled neck for the can, the inner wall and the outer wall of which slope in reverse directions with respect to each other.

The lid 17 is provided with a substantially cylindrical depending flange 18 which forms a stopper. The stopper is adapted to fit snugly within the neck 14 and is similar in contour to the latter, that is, it is tapered downwardly, the widest end of the stopper being at the top. Outside of the stopper the lid is provided with a substantially frusto-conical skirt 19 which is adapted to fit snugly against the outer surface of the similar shaped skirt 16 of the neck of the can.

The depending flange 18 of the lid and the cylindrical skirt 19 of the lid provide a double walled stopper which telescopically receives the double walled neck of the can. As a result of this construction foreign matter cannot work its way through the circuitous path between the stopper and the neck of a can and neither can milk escape from the can through the same path and run down the sides of the can.

The space between the funnel shaped flange 16 and lead 17 forms a trap for any milk escaping between the stopper 18 and neck 14 so that no milk can reach the outside of the can under severe conditions of transportation.

A modified form of the invention is shown in Figure 3 in which the frusto-conical top 20 of the milk can is provided with a cylindrical neck 21, the metal of which is bent outwardly and in a reverse direction at the top of the neck to provide a skirt 22 which is soldered or otherwise fixed to the top of the can. The skirt is substantially frusto-conical in contour.

The lid 23 of the modified form of the invention is provided with a cylindrical depending flange 24 adapted to fit snugly against the inner surface of the cylindrical neck 21 of the can and is also provided outside of the depending flange with a frusto-conical skirt 25 that is adapted to fit snugly against the outer surface of the skirt 22 of the neck.

From the above description it is thought that the construction and operation of the invention will be fully understood without further explanation.

What is claimed is:

A milk can including a body, a frusto-conical top for the body, an upstanding neck on the top including concentric spaced walls inclined oppositely to each other, and a funnel shaped flange connecting the walls at their upper ends, a lid, and a stopper depending from the lid having spaced annular walls inclined to conform to the inclination of the neck walls and telescopically receiving the neck walls between them, the funnel shaped flange forming a trap below the lid to prevent escape of milk to the exterior of the can under severe conditions of service.

DAVID A. HARRIS.